United States Patent [19]

Broadt

[11] 4,399,490

[45] Aug. 16, 1983

[54] OPAQUE REFLECTOR FOR MULTILAMP PHOTOFLASH ARRAY

[75] Inventor: David R. Broadt, Lewisburg, Pa.

[73] Assignee: GTE Products Corporation, Stamford, Conn.

[21] Appl. No.: 238,867

[22] Filed: Feb. 27, 1981

[51] Int. Cl.³ .......................................... G03B 15/02
[52] U.S. Cl. ..................................... 362/11; 362/16; 362/17; 362/184; 362/241; 362/346; 362/362
[58] Field of Search ................. 362/11, 16, 17, 346, 362/351, 355, 360, 361, 184, 241, 362

[56] References Cited

U.S. PATENT DOCUMENTS 4,104,706  8/1978  Hanson ................................ 362/11
4,133,023  1/1979  Hanson ................................ 362/11

OTHER PUBLICATIONS

Clark et al., The Encyclopedia of Chemistry, 2nd Ed., pp. 169-170.

Primary Examiner—Donald P. Walsh
Attorney, Agent, or Firm—Thomas H. Buffton

[57] ABSTRACT

A multilamp photoflash unit includes a housing member having a plurality of lamp-receiving cavities of a relatively opaque material with a reflective surface adjacent the lamp whereby back radiation from the lamp is reduced. Also, a reflector having cavities of opaque pigmented plastic resin material and a reflective surface may be disposed within a plastic housing and serve to inhibit back radiation from a lamp.

3 Claims, 3 Drawing Figures

OPAQUE REFLECTOR FOR MULTILAMP PHOTOFLASH ARRAY

TECHNICAL FIELD

This invention relates to multilamp photoflash arrays and more particularly to opaque reflectors for photoflash arrays.

BACKGROUND ART

A common form of multilamp photoflash array is the cube configuration as exemplified by the flashcube of U.S. Pat. No. 3,327,105 or the magicube of U.S. Pat. No. 3,730,669. In this cube configuration, a number of flashlamps are enclosed in a housing member and directed at an angle of about 90° with respect to one another. Thus, a reflector-flashlamp entity is disposed rearward of the flashlamp being energized and, as a consequence, rearward light radiation is not a problem.

Another popular multilamp photoflash configuration is known as the flip flash and is illustrated in U.S. Pat. Nos. 3,894,226 and 4,017,728. In this substantially planar formation, a relatively flat back housing member is affixed to a front housing member having a plurality of cavities therein. Progressing from back to front of the housing member is a plurality of flashlamps, a multicavity reflector, an insulating sheet and a printed circuit board. Thus, an abundance of shielding is provided rearward of the flashlamps and rearward light radiation is inhibited.

Other multilamp photoflash arrays include a dual direction configuration wherein a reflector unit is disposed within a housing member and includes a plurality of cavity formations in a back-to-back relationship. Although such cavity formations do provide rearward shielding for one another and a reduced tendency toward distortion due to activation of adjacent flash lamps, problems of compactness and space efficiency are encountered with known designs.

Further, unidirectional multilamp photoflash arrays are known wherein a plurality of cavities are aligned to face in a single direction. In such structures it is common to provide cavity members having sidewalls which are in a plane substantially normal to the opening of the cavities in order to maximize the available space. However, these substantially normally-positioned cavity member sidewalls are rather difficult to conveniently cover or provide with a reflector surface. As a result, a problem of excessive light emanating in a rearward direction is encountered because of the relatively poorly coated or lack of opaqueness of the cavity members.

One known approach to the above-mentioned undesired and excess of rearward light encountered upon activation of a flashlamp is to provide a shield of opaque material rearward of the aligned cavity members. However, it is obvious that such a structural addition is not only expensive of materials and labor but also is detrimental to the economical use of available space.

SUMMARY OF THE INVENTION

Accordingly, it is an object of the present invention to provide a photoflash array of cost-efficient construction with enhanced shielding of rearward light radiation. Another object of the invention is to provide a multilamp photoflash array of a unidirectional planar configuration with improved shielding of rearward light. Still another object of the invention is to provide an improved reflector unit for a multilamp photoflash unit wherein light emitted by an activated flashlamp and directed rearward is shielded from an operator.

These and other objects, advantages and capabilities are achieved in one aspect of the invention by a photoflash array having a housing member with at least one cavity formed to receive a flashlamp and having a reflective surface adjacent the flashlamp wherein the housing member cavity is formed from a relatively opaque pigmented plastic resin.

In another aspect of the invention, a multilamp photoflash array includes a housing member with a back portion having a plurality of cavities and a reflector unit with a plurality of cavities formed to nest in the cavities of the housing member. The reflector unit cavities are configured to receive flashlamps, have a reflective surface adjacent the flashlamps and are formed of a relatively opaque pigmented plastic resin material.

PREFERRED MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
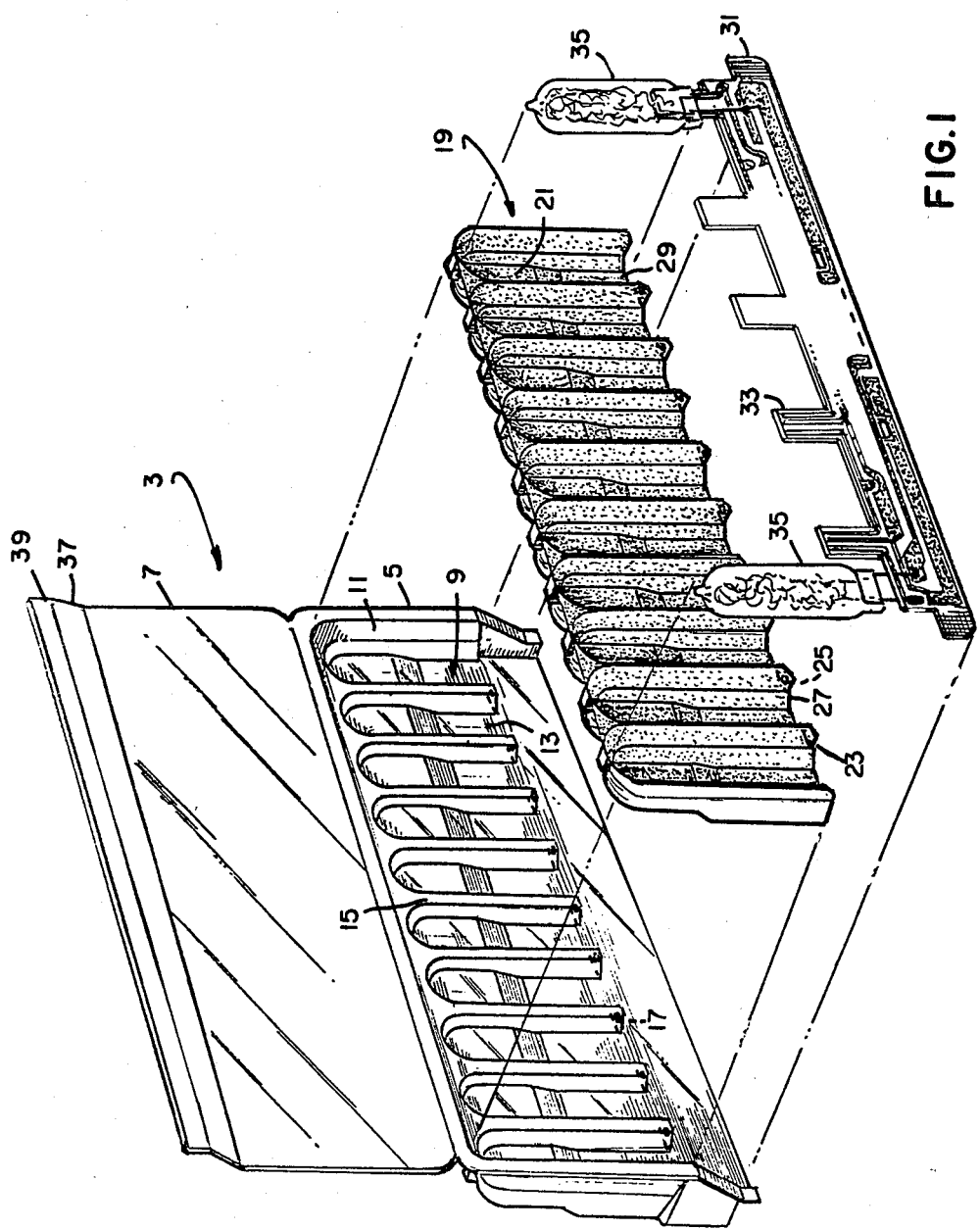
FIG. 1 is an exploded view of a preferred form of multilamp photoflash array illustrating the invention.

Referring to the drawings, FIG. 1 illustrates a multilamp photoflash array having a housing member 3 which includes a back portion 5 and a front portion 7. The back portion 5 includes a plurality of cavities 9 aligned in a single plane and preferably facing in a single direction. The cavities 9 are spaced from one another and each includes a pair of oppositely disposed side walls 11 extending in a direction substantially normal to the plane of the array. Moreover, each of the cavities 9 includes an offset 13 in a plane parallel to the plane of the array and is utilized in a manner to be explained hereinafter.

Also, each of the spaced cavities 9 has an interconnecting spaced portion 15 therebetween whereby the side walls 11 of adjoining cavities are connected. A venting aperture 17 is preferably disposed within the interconnecting spaced portion 15 whereby an indirect passageway is provided from the interior of the cavities 9 to the exterior of the housing member 3.

Further, the back portion 5 of housing member 3 or at least the cavities 9 may be formed from a relatively opaque pigmented plastic resin material. For example, the back portion 5 may be of a thermoplastic resin material having carbon black or titanium dioxide pigmentation therein. Moreover, the cavities 9 each have a coating of a reflective material such as aluminum.

Additionally, a reflector unit 19 may be disposed within the housing member 3. The reflector unit 19 has a plurality of spaced cavity members 21 formed to nest within the cavities 9 of the back portion 5 of the housing member 3. The cavity members 21 are joined by a spacer portion 23 wherein is disposed a venting aperture 25 aligned with the venting aperture 17 of the back portion 5 of the housing member 3.

Each of the cavity members 21 of the reflector unit 19 includes a pair of oppositely disposed side walls 27 which are in a plane substantially normal to the opening of the cavity members 21. An off-set portion 29 is also provided in a plane substantially parallel to the plane of the opening of the cavity members 21 and is formed for nesting within the cavities 9 of the back portion 5.

A coating of reflective material such as aluminum is deposited on the surface of the cavity members 21 facing the opening thereof which includes the side walls 27. Importantly, the reflector unit 19 or at least the spaced cavity members 21 are formed of a thermoplastic resin having an opaque pigmented resin therein such as carbon black or titanium dioxide for example.

A printed circuit board 31 includes a plurality of upstanding finger member 33 which are formed for deposition within the offset 13 of the back portion 5 of the housing member 3 or within the off-set portion 29 of a reflector unit 19. Also, a plurality of lamps 35 are affixed to the printed circuit board 31 and formed for disposal within the cavities 9 of the back portion 5 of the housing member 3 or within the cavity members 21 of the reflector unit 19.

The front portion 7 of the housing member 3 is of a light transmitting material such as a clear plastic material and includes a tapered portion 37 and a relatively flat portion 39. Also, the back and front portions 5 and 7 of the housing member 3 are foldable with respect to one another.

In one embodiment, the cavities 9 of the housing member 3 have a reflective surface and are fabricated of an opaque material. The flashlamps 35 are affixed to the printed circuit board 31 and disposed within the cavities 9. Then, the light transparent back portion 5 is folded and the relatively flat portion 39 thereof is affixed to the circuit board 31 with the tapered portion 37 providing a space for attachment of the flashlamps 35 to the circuit board 31 as well as an air passage from the cavities 9 to the exterior of the housing member 3 by way of the venting aperture 17.

In another embodiment, the reflector unit 19 is nested within the cavities 9 of the back portion 5 with the venting aperture 17 of the back portion 5 and the venting apertures 25 of the reflector unit 19 aligned. Then the relatively flat portion 39 of the back portion of the housing member 3 is affixed to the printed circuit board 31 to provide a seal therebetween.

Figure 2A:
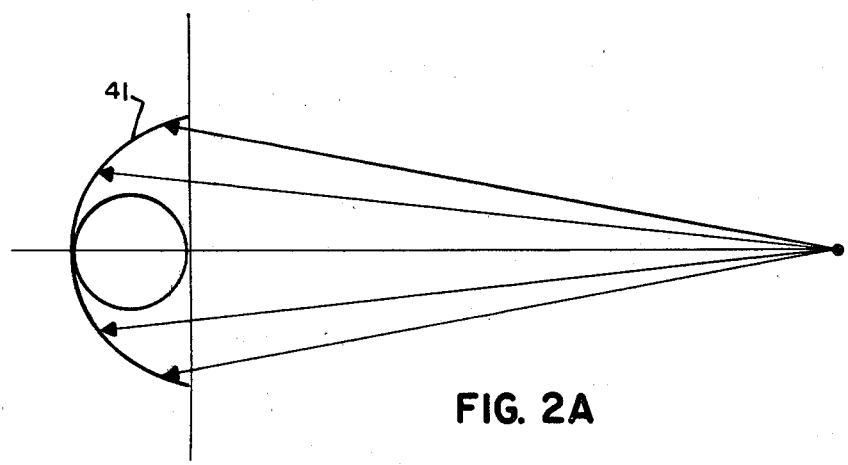
FIGS. 2A and 2B are structures illustrating a common technique for aluminizing reflectors having hemispherical and substantially normal sidewall configurations.
Figure 2B:
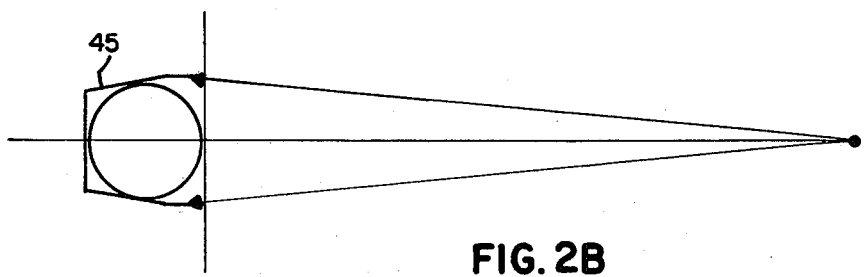

Referring to the graphic illustrations of FIGS. 2A and 2B, it can readily be seen that the relatively hemispherical surface 41 of FIG. 2A is easily covered by a reflective coating dispensed from a source 43. On the other hand, a surface 45, such as the sidewalls of FIG. 2B which are substantially normal to the source 43, are much more difficult to cover with a reflective material. However, the consumer requisites for flashlamp structures of smaller configurations necessitate structures (FIG. 2B) wherein the sidewalls are substantially normal to the opening as opposed to the larger hemispherical configurations (FIG. 2A).

Further, it is well known that a camera operator is only inches behind a flash array and it is imperative to keep the back radiation as small as possible. Thus, the combining of a steep-walled reflector which is difficult to aluminize with a relatively opaque pigmented plastic serves to reduce the back radiation in an amount sufficient to provide a satisfactory product. For example, assuming the transmittance of the aluminizing layer of a steep-walled reflector as about 2% and the transmittance of the relatively opaque pigmented resin as about 1%, the back radiation would only be about 0.002 times the output of a lamp. Thus, relatively opaque reflector material compensates for the difficult to aluminize steep-walled structure to provide a satisfactory configuration.

While there has been shown and described what is at present considered the preferred embodiments of the invention, it will be obvious to those skilled in the art that various changes and modifications may be made therein without departing from the invention as defined by the appended claims.

INDUSTRIAL APPLICABILITY

A multilamp photoflash unit has been provided which includes a unique housing member having a plurality of spaced lamp-receiving cavities aligned to face in one direction, a reflective surface and, importantly, is fabricated from a relatively opaque pigmented plastic resin material. The combined reflective surface and opaque material serves to reduce back radiation from the lamp to a relatively low value such that a camera operator would not be distressed by back radiation even though the light source is relatively close to the operator.

In a preferred embodiment, a reflector unit is disposed within a housing member. The reflector unit includes a plurality of spaced cavities which nest in the housing member. These cavities are fabricated from a relatively opaque pigmented plastic resin and have a reflective material on a surface adjacent a lamp or light source. Back radiation from the lamp is reduced by the combined reflective surface and opaque material.

What is claimed:

1. A photoflash array having a housing member containing a reflector unit which includes at least one cavity formed to receive a flashlamp and characterized by the improvement wherein said cavity includes a pair of spaced sidewalls with a reflective material on said pair of spaced sidewalls substantially normal to the opening thereof and on the surface thereof immediately adjacent said flashlamp and is formed from a relatively opaque pigmented plastic resin material selected from the group consisting of carbon black and titanium dioxide whereby back radiation of light energy is inhibited.

2. A photoflash array having a housing member which includes a back portion and a light transmitting front portion, said back portion having at least one cavity therein formed to receive a flashlamp, said cavity of said housing member having a reflective surface immediately adjacent said flashlamp and characterized by the improvement wherein a pair of spaced sidewalls are substantially normal to the opening of said cavity and a relatively opaque pigmented plastic resin material selected from the group consisting of carbon black and titanium dioxide is used to form said cavity of said back portion.

3. The photoflash array of claim 2 wherein said cavity includes a pair of spaced sidewalls in a plane substantially normal to the plane of said photoflash array.

* * * * *